Oct. 25, 1938.                    H. E. SADLER.                    2,134,644
                              REFRIGERATED BACK BAR
                               Filed Aug. 31, 1937

INVENTOR
Herbert E. Sadler
BY
Fred C. Matheny
ATTORNEY

Patented Oct. 25, 1938

2,134,644

UNITED STATES PATENT OFFICE 2,134,644

REFRIGERATED BACK BAR

Herbert E. Sadler, Seattle, Wash.

Application August 31, 1937, Serial No. 161,776

2 Claims. (Cl. 62—143)

This invention relates to back bars for use in beer parlors and to methods of handling and dispensing beer from kegs and a primary object of this invention is to provide a back bar which will keep beer always at a predetermined temperature and will render unnecessary the usual cooling coils through which beer from kegs is ordinarily dispensed.

The commonly used system of dispensing beer from kegs through cooling coils is objectionable because the coils become obstructed and clogged with sediment and get into an unsanitary condition and have to be cleaned out at intervals and further because the coils are relied on to cool the beer as it is drawn off, thus permitting the beer to be maintained in the keg at a higher temperature than that at which the beer should be kept and yet be cool when drawn, the result of not keeping the beer in the keg properly cooled being deterioration in the quality of the beer in the keg. Also this system of cooling the beer as it is drawn off has been found to be expensive.

It is an object of my invention to overcome all of the objections above pointed out by providing a refrigerated receptacle in the form of a back bar within which kegs containing beer are kept and from which the beer is drawn off directly from the keg without the use of any cooling coils.

It is a further object of this invention to provide a back bar of this type in which the kegs containing the beer are in plain view of the customers so that they can see that the beer is being drawn directly from the keg, it having been found that customers prefer to see the keg and see the beer drawn from the keg.

It is a further object of this invention to provide a refrigerated receptacle in the form of a back bar of this type in which the faucets from the kegs containing the beer extend directly through the front walls or doors of the back bar so that the beer in a keg within the back bar can be drawn by a person directly in front of the back bar.

Further objects of this invention are to provide a back bar of this type which is attractive and ornamental in appearance and displays the beer kegs in an attractive manner and under controlled lighting conditions and to provide beer cooling apparatus which is less expensive to install, less expensive to operate and more efficient in keeping the beer at the proper temperature than the usual beer cooling system now in common use.

Other and more specific objects of the invention will be apparent from the following description taken in connection with the accompanying drawing.

For the purpose of this application I have described the invention as applied to the handling of beer in kegs but it will be understood that the same is applicable to the handling of any other beverages or liquids stored in kegs or similar containers and dispensed directly from the containers.

In the drawing, Fig. 1 is a view in front elevation of a back bar constructed in accordance with this invention showing kegs in place in said back bar.

Like reference numerals designate like parts throughout the several views.

Figure 1:
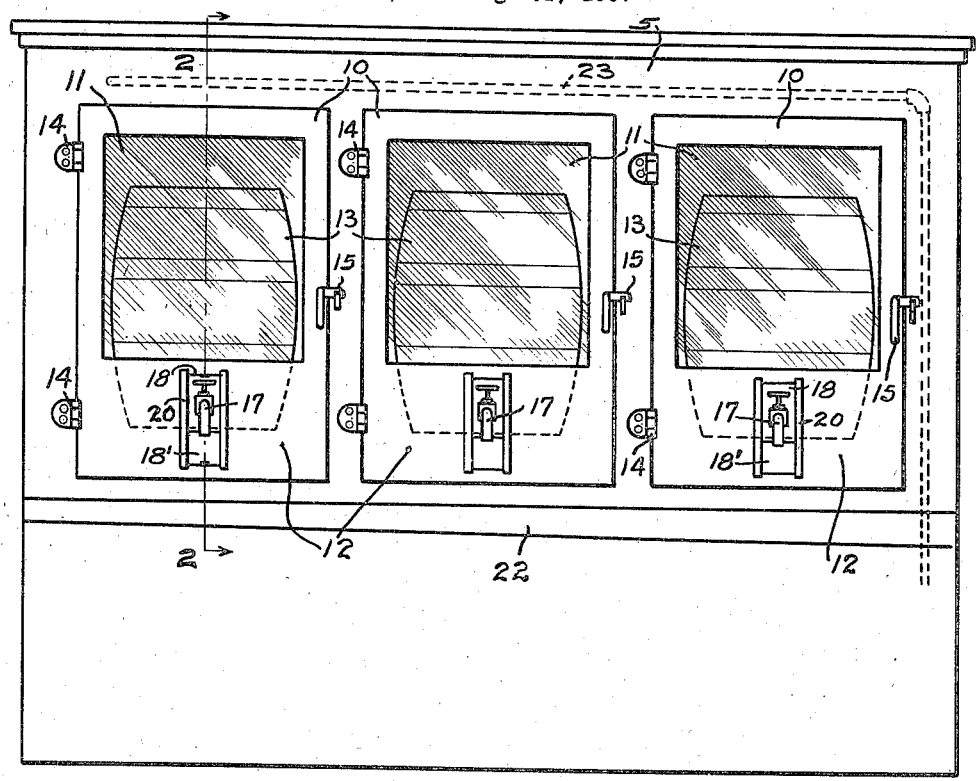
Figure 2:
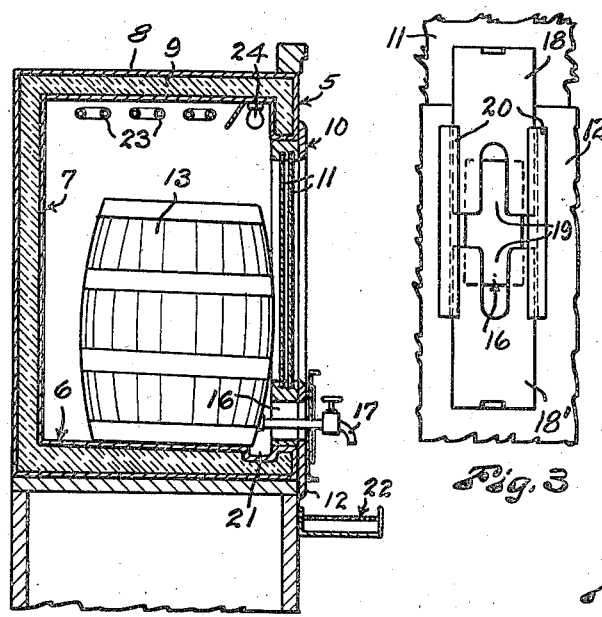
Fig. 2 is a vertical sectional view substantially on broken line 2—2 of Fig. 1.
Figure 3:
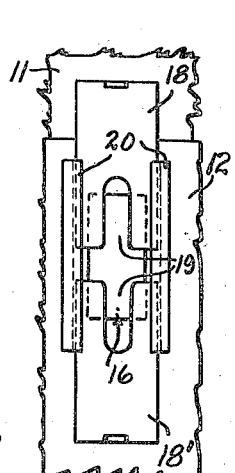
Fig. 3 is a detached elevation on a larger scale of a detail of the invention, parts being broken away.

The drawing shows a back bar in the nature of a refrigerated receptacle comprising a front wall 5, bottom 6, rear wall 7, and top wall 8. These walls preferably include suitable refractory material 9 to insulate the receptacle against changes of temperature. A plurality of doors 10 are provided at the front of the receptacle. Each of the doors 10 preferably comprises an upper transparent portion 11, preferably formed of two spaced apart layers or panes of glass, and a lower non-transparent portion 12. The space back of each door 10 is large enough to receive a keg 13 wherein beer is contained and the transparent section 11 in each door is large enough so that the major portion of the keg on the inside of said door is clearly visible to persons in front of the back bar and especially to customers at the usual bar or counter in front of the back bar. The doors 10 are preferably mounted on hinges 14 and provided with latches 15 and the doorways or openings closed by said doors are preferably large enough to permit the kegs to be put into the receptacle and taken out of said receptacle through said doorways.

The non-transparent section 12, of each door is provided with an opening 16 through which a spigot or draw-off faucet 17 from the adjacent keg may extend. These draw-off faucets 17 are long enough to extend from a keg outwardly through the adjacent door and far enough beyond the door so that beer from the keg may be conveniently drawn off. Preferably two vertically movable plates 18 and 18' are provided over each opening 16 to provide a tight closure around the shank of the faucet which extends outwardly through the opening 16 and conserve refrigeration. Each of these plates has a notch 19 into which the faucet shank fits and the two plates are mounted for vertical movement in channel shaped guides 20 positioned vertically at the sides of the opening 16. The notches 19 are respectively positioned in the bottom edge of the upper plate 18 and the top edge of the lower plate 18' and the two plates 18 and 18' are movable vertically to conform to variations in the vertical position of different faucets as required by different kegs. When the two plates 18 and 18' are moved apart it is possible to insert a faucet 17 through an opening. Usually the kegs are positioned behind the doors and the faucets 17 inserted through the openings 16 from the outside of the doors. The faucets are of standard construction and are provided on their inner ends with standard fittings which engage with cooperating fittings on the kegs to establish draw off means, as these faucets or spigots and the keg fittings by which they are quickly and easily connected with, or disconnected from the kegs, are of standard construction and as several different types of these faucets are now in common use they are not herein shown or described in detail.

The floor 6 of the refrigeration compartment of this back bar is preferably inclined forwardly so that substantially all of the beer can be drawn out of the kegs, the faucets being connected with the kegs flush with the ends of the kegs which rest on the floor 6. A gutter 21 is preferably provided along the forward edge of the floor to take care of any beer or liquid which is spilled from or leaks out of the kegs. Also a combined support and gutter 22 extends along the front side of the back bar below the faucets to support the glasses or mugs into which beer is being drawn off.

Any suitable cooling means, as coils 23, shown by dotted lines in Fig. 1, and connected with any suitable refrigeration apparatus, not shown, may be provided for cooling the back bar receptacle. Also suitable lamps 24 are provided in the receptacle for proper illumination.

Figure 4:
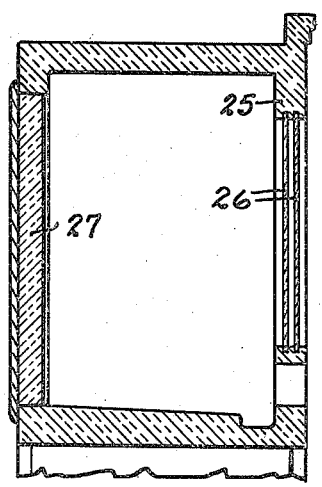
Fig. 4 is a sectional view of a modified form of the invention in which the front of the back bar is in the form of a wall, free from doors but having windows and spigot outlet openings therein, and having a door in the back portion thereof.

Fig. 4 is a cross sectional view showing a modification of the invention in which the front wall 25 of the back bar receptacle is made an integral part of said receptacle and is provided with openings for the spigots and with windows 26 through which the kegs 13 may be seen and a door 27 is provided in the back wall of the receptacle through which the kegs may be moved into and out of said receptacle.

The back bar receptacle hereinbefore described is simple in construction attractive in appearance, efficient in operation, not expensive to install and maintain and overcomes many problems which obtain in the keeping and cooling and dispensing of beer. I have shown a back bar receptacle designed for receiving and displaying three kegs but it will be understood that the same may be of any desired size to receive and display one or more kegs.

The plates 18 and 18' are preferably held tight enough by the guides 20 so that they will stay in any position in which they are placed until manually moved and said plates may thus be closed tightly around the shank of a spigot so as to exclude air circulation and prevent warm air from entering the refrigeration compartment. The end portions of these plates may overlap when the plates are closed against a spigot shank.

It has been found that metal cooling coils will sometimes adversely affect the flavor of beer which is passed through said coils and that the reaction between the metal cooling coils and the beer may even tend to render the beer poisonous to the user. When beer is drawn directly from the keg, as it is when my refrigerated back bar is used, the cooling coils are eliminated and this danger of injuring the flavor of the beer or rendering the same injurious to the user is done away with.

In addition to serving as a cooling receptacle for the beer in the kegs, my refrigerated back bar may serve as a refrigerator for other articles. Also the space below the refrigeration compartment may be utilized for the storage of goods which are not to be refrigerated.

The foregoing description and accompanying drawing clearly disclose what I now regard as a preferred embodiment of my invention, but it will be understood that this disclosure is merely illustrative and that such changes in the invention may be resorted to as are within the scope and spirit of the following claims.

I claim:

1. A back bar, comprising an ornamental front wall portion, the outer side of which constitutes the visible portion of the back bar; wall means cooperating with said front wall to provide a refrigeration receptacle back of said front wall for the reception of kegs which contain liquid and are provided with spigots; means forming spigot passageways in said front wall through which the spigots may extend, said passageways being relatively long vertically to provide for variation in the vertical positions of the spigots of different kegs; two guide members positioned in spaced apart parallel relation at the respective sides of said passageways; two vertically movable plates of thin sheet metal slidably supported in said guide members adapted to receive therebetween the shank portions of spigots, said plates having relatively deep notches in their adjacent edges fitting over the spigot shanks, the ends of said two plates being overlapped when said two plates are closed on a spigot and said two plates being adapted to be moved apart to permit a spigot to be inserted therebetween.

2. A back bar of the class described, comprising a front wall portion having door openings therein, the front side of said front wall portion constituting an ornamental visible portion of the back bar; wall means cooperating with said front wall portion to provide a refrigeration receptacle back of said front wall portion for the reception of kegs of beer which are adapted to have spigots connected therewith near the bottom ends of the kegs, said wall means including a floor which is inclined downwardly from rear to front of the back bar whereby kegs placed thereon will be supported in forwardly inclined positions to provide for a complete drainage of beer therefrom; doors positioned to close the door openings in said front wall portion; drain means extending lengthwise of said receptacle at the junction of said front wall portion and said floor; transparent windows in the upper portions of said doors; means forming spigot passageways in said doors below said window sections through which the spigots in the kegs may extend; sliding plate means positioned to close the spigot passageways around the spigots; and a combined receptacle support and drain forming a horizontal shelf extending across the front of said back bar below said spigot passageways.

HERBERT E. SADLER.